United States Patent [19]
Liu

[11] Patent Number: 5,678,843
[45] Date of Patent: Oct. 21, 1997

[54] LUGGAGE TROLLEY STRUCTURE

[76] Inventor: Chin-Shung Liu, 2F, No. 6, Lane 75, Sec. 4, MinSheng E. Road, Taipei, Taiwan

[21] Appl. No.: 553,897

[22] Filed: Nov. 6, 1995

[51] Int. Cl.⁶ ..................................... B62B 1/12
[52] U.S. Cl. ............................ 280/655; 280/47.315
[58] Field of Search ........................... 280/638, 652, 280/654, 655, 655.1, 47.17, 47.27, 47.315, 47.131

[56] References Cited

U.S. PATENT DOCUMENTS

| | | | |
|---|---|---|---|
| 5,308,103 | 5/1994 | Liu | 280/655 |
| 5,351,984 | 10/1994 | Cheng | 280/655 |
| 5,367,743 | 11/1994 | Chang | 280/47.315 |
| 5,371,923 | 12/1994 | Chang | 280/655 |

FOREIGN PATENT DOCUMENTS

| | | | |
|---|---|---|---|
| 3013031 | 10/1981 | Germany | 280/655.1 |
| 4-183672 | 6/1992 | Japan | 280/654 |
| 4-183673 | 6/1992 | Japan | 280/654 |
| 4-183674 | 6/1992 | Japan | 280/654 |
| 4-183675 | 6/1992 | Japan | 280/654 |

Primary Examiner—Brian L. Johnson
Assistant Examiner—Frank Vanaman
Attorney, Agent, or Firm—Bacon & Thomas

[57] ABSTRACT

A luggage trolley structure includes a wheeled base to which two upright bars are mounted, each having three telescoping sections, an upper section, an intermediate section and a lower section. A telescoping mechanism is provided within each of the bars. The telescoping mechanism includes a slide movably received within the upper section of upright bar and connected to a manually movable member to be moved thereby. The slide has a slot of gradually increasing depth within which a spherical member is received so that by the inclination of the slot, when the slide is moved relative to the upper section, the spherical member is forced to project through a hole formed the intermediate section and a hole formed on the upper section so as to retain them at the expanded position. The slide also has an inclined lower surface which cooperates with a leaf spring that has a first limb fixed inside the intermediate section and a second limb fixed to a positioning pin movably retained within a hole formed on the intermediate section to be biased into a hole formed on the lower section for retaining the intermediate and lower sections at the expanded position to release the retaining engagement between the pin and the hole of the lower section.

3 Claims, 4 Drawing Sheets

5,678,843

LUGGAGE TROLLEY STRUCTURE

FIELD OF THE INVENTION

The present invention relates to a luggage trolley and in particular to the telescoping mechanism of a telescopic luggage trolley.

BACKGROUND OF THE INVENTION

Luggage trolleys have been widely used for moving bulky and heavy luggage during travelling. One of the conventional luggage trolley designs has a wheeled base from which two parallel bars extend upward with a handle extending between upper free ends of the two bars. Luggage is placed on the wheeled base and supported by the two bars. Users may move the trolley by simply gripping the handle and slightly tilting the trolley to an angle relative to the ground. Such a conventional luggage trolley occupies quite a space when not in use. Thus telescopic luggage trolleys were later developed in which the two upright bars were made of two or three sections telescoping within each other so as to allow the trolley to occupy only a limited space when not in use. To provide an easy way to operate the telescopic luggage trolley, telescoping mechanism is provided within each of the telescopic bars and the present invention is related to an improvement of the telescoping mechanism to be used in a telescopic luggage trolley.

SUMMARY OF THE INVENTION

The principal object of the present invention is to provide a telescopic luggage trolley wherein the telescoping mechanism comprises less parts so as to make it easier to operate, maintain and manufacture.

In accordance with the present invention, there is provided a luggage trolley structure comprising a wheeled base to which two upright bars are mounted, each having three telescoping sections, an upper section, an intermediate section and a lower section. A telescoping mechanism is provided within each of the bars. The telescoping mechanism comprises a slide movably received within the upper section of upright bar and connected to a manually movable member to be moved thereby. The slide has a slot of gradually increasing depth within which a spherical member is received so that by the inclination of the slot, when the slide is moved relative to the upper section, the spherical member is forced to project through a hole formed the intermediate section and a hole formed on the upper section so as to retain them at the expanded position. The slide comprises an inclined lower surface which cooperates with a leaf spring, that has a first limb fixed inside the intermediate section and a second limb fixed to a positioning pin movably retained within a hole formed on the intermediate section to be biased into a hole formed on the lower section for retaining the intermediate and lower sections at the expanded position, to release the retaining engagement between the pin and the hole of the lower section.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
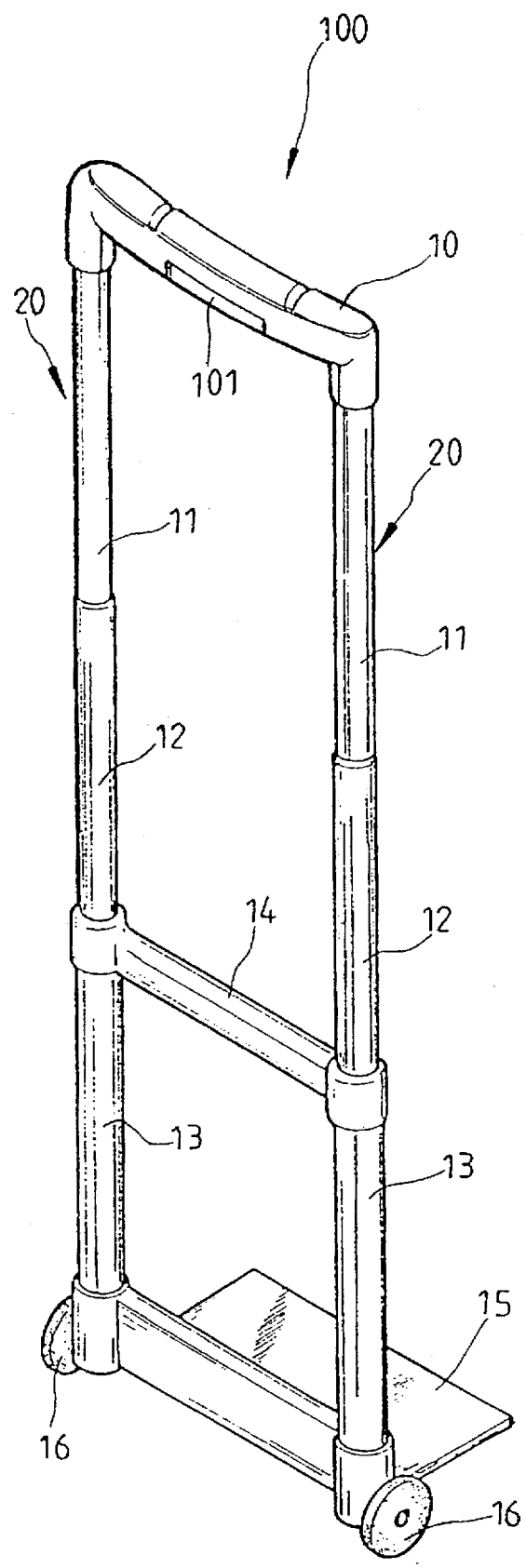
FIG. 1 is a perspective view showing a luggage trolley constructed in accordance with the present invention.

With reference to the drawings and in particular to FIG. 1, wherein a luggage trolley constructed in accordance with the present invention, generally designated with reference numeral 100, is shown, the luggage trolley 100 comprises a base plate 15 to which at least two wheels 16 are mounted for rollingly supporting the base plate 15 on, for example, the ground. Two upright bars 20 are mounted on the base plate 15 and extend substantially upward from the base plate 15 in a spaced and substantially parallel manner. A handle 10 is mounted between upper free ends of the upright bars 20. Each of the upright bars 20 comprises three sections, a lower section 13, an intermediate section 12 and an upper section 11, telescoping within each other. The luggage trolley 100 may further comprise a cross bar 14 extending between the two upright bars 20 at a location along the upright bars 20 between the handle 10 and the base plate 15.

In the embodiment illustrated, the upper section 11, intermediate section 12 and lower section 13 of each of the upright bars take the form of elongated cylindrical tubes respectively having first, second and third inside and outside diameters. However, it should be noted that elongated tubular members having different cross-sectional configurations may also be adapted without departing from the scope of the present invention.

To telescope within each other, the first outside diameter of the upper section 11 of each of the upright bars 20 is smaller than the second inside diameter of the intermediate section 12 so as to be received within the intermediate section 12 and the second outside diameter of the intermediate section 12 is smaller than the third inside diameter of the lower section 13 so as to be received within the lower section 13.

A telescoping mechanism is provided within each of the upright bars 20 and is controlled by means of a press member 101 which constitutes a portion of the handle 10 to be held by a user's hand (not shown) and is movable relative to the handle 10 when pressed by the user's hand. The telescoping mechanism will be further described with reference to FIGS. 2–5.

Figure 2:
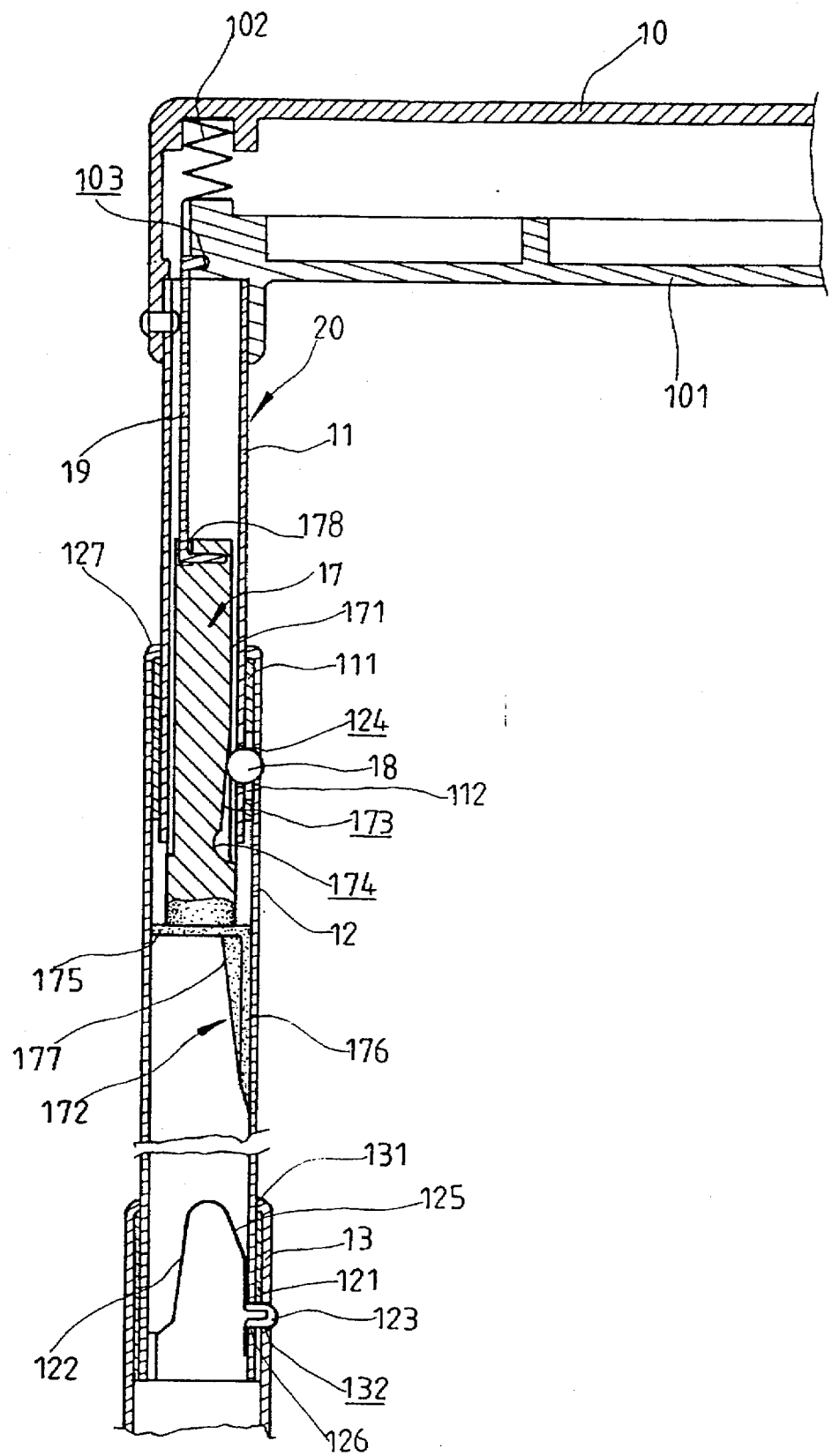
FIG. 2 is a partial cross-sectional view showing the expansion of the telescopic upright bars of the luggage trolley constructed in accordance with the present invention.
Figure 3:
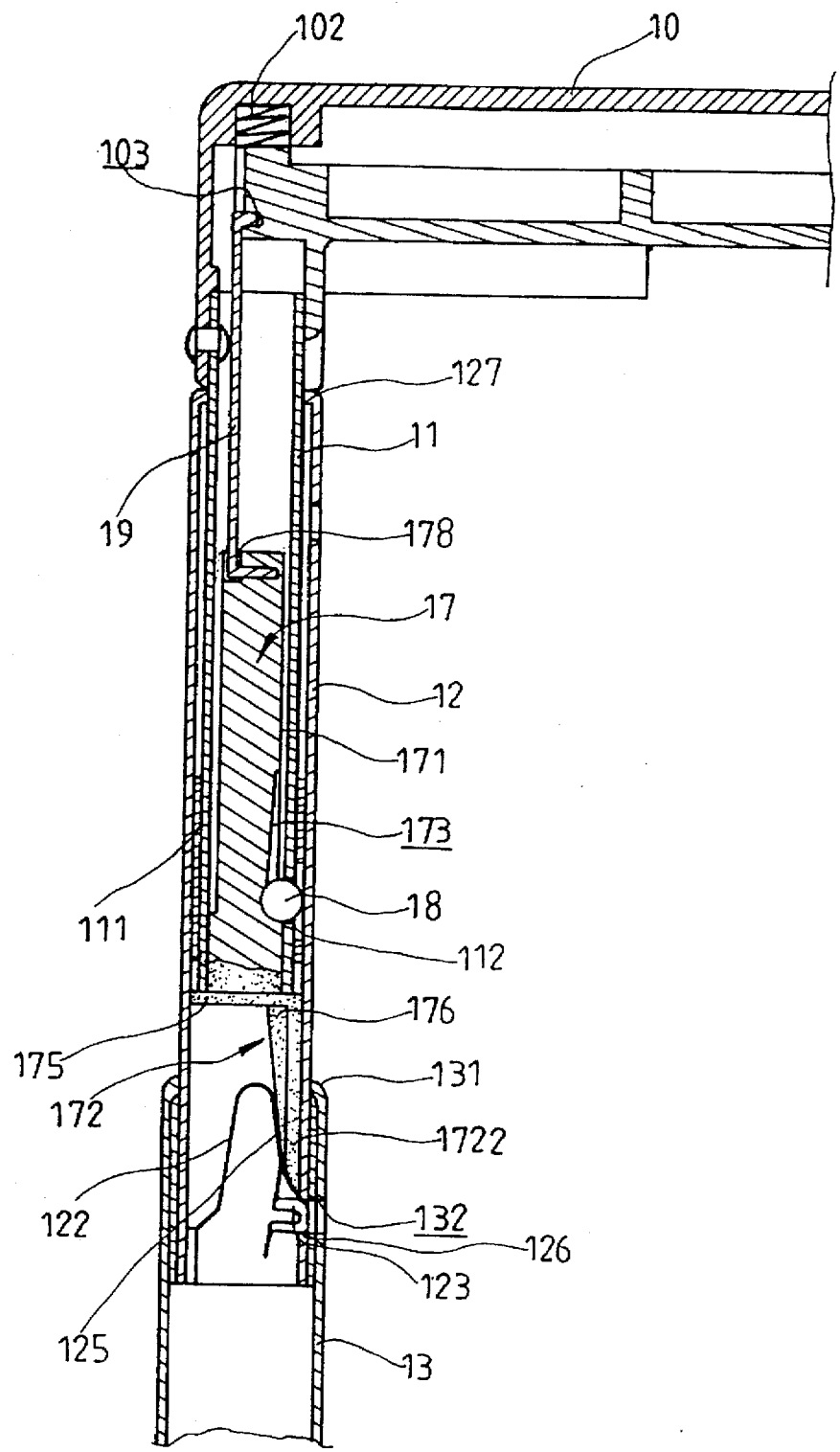
FIG. 3 is a partial cross-sectional view showing the contraction of the telescopic upright bars of the luggage trolley constructed in accordance with the present invention.
Figure 5:
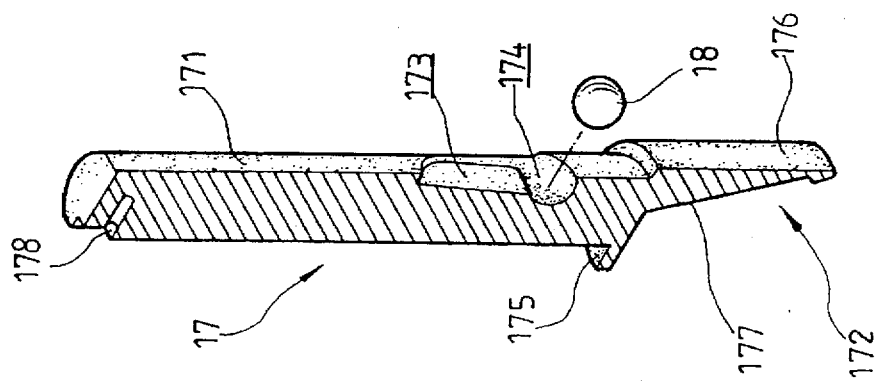
FIG. 5 is a perspective view of the slide with one half removed to more clearly show the structure thereof.
Figure 4:
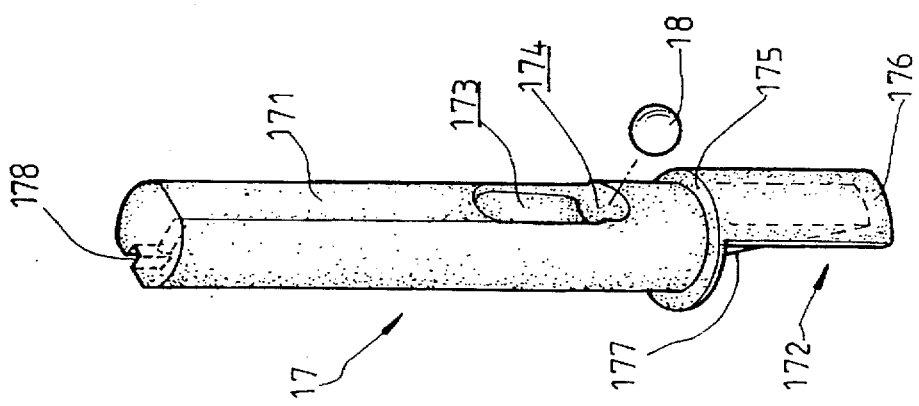
FIG. 4 is a perspective view showing the slide adapted in the telescoping mechanism of the present invention.

The telescoping mechanism comprises a slide 17, most clearly shown in FIGS. 4 and 5, having an upper segment 171 of a size slidably receivable within the upper section 11 of the upright bar 20, see FIGS. 2 and 3. For example, in the embodiment illustrated, the upper segment 17 may be an elongated cylindrical body extending along an axial direction of the upright bar 20 and having a diameter slightly smaller than the first inside diameter of the upper section 11 of the upright bar 20 so as to be movably received therein.

The slide 17 further comprises a lower segment 172 extending along the axial direction from an axial lower end of the upper segment 171 of the slide 17 and defining therebetween a circumferential shoulder 175 surrounding the lower end of the upper segment 171. The slide 17 is received within each of the upright bars 20 so as to have the lower segment located within the second inside diameter of the intermediate section 12 of the bar 20 while the upper segment 171 within the first inside diameter of the upper section 11 of the bar 20 with a portion thereof that is connected to the lower segment 172 located within the intermediate section 12.

The upper segment 171 of the slide 17 has an axially-extending elongated slot 173 which, as shown in FIGS. 2 and 3, has a depth varying from a smallest value at an axially upper end thereof to a largest value at an opposite lower end so as to define an inclined bottom. Preferably, a recess 174 that has a depth greater than the greatest depth of the inclined bottom of the slot 173 is formed at the lower end of the slot 173.

A through hole 112 is formed on the upper section 11 of each of the upright bars 20 to correspond to the slot 173 within which hole 112 a spherical member 18 is received and retained. The spherical member 18 is partially received within the slot 173 and is allowed to enter the recess 174 when the slide 17 is moved relative to the upper section 11 of the upright bar 20. The intermediate section 12 of the upright bar 20 has a through hole 124 corresponding to the hole 112 of the upper section 11 so that when the upper section 11 is moved relative to the intermediate section 12 to have the holes 112 and 124 aligned with each other, the spherical member 18 is allowed to partially enter the hole 124 so as to retain the upper section 11 to the intermediate section 12 at an expanded condition.

The lower segment 172 of the slide 17 comprises a first surface 176 which corresponds to the inside contour of the intermediate section 12 to be receivable therein and a second opposite surface 177 which is inclined relative to the first surface 176 so as to be tapering from connection between the upper and lower sections 171 and 172 to a lower free end of the lower section 172.

A leaf spring 122, preferably in the form of a substantial U shape, is arranged within the intermediate section 12 of each of the upright bars 20, having two limbs of which one is fixed inside the intermediate section 12 and the second one is fixed to a positioning pin 123 which is movably retained within a through hole 126 formed on the intermediate section 12 so as to bias the pin 123 into a hole 132 formed on the lower section 13 when the holes 126 and 132 are aligned to retain the intermediate section 12 to the lower section 13 at the expanded condition. The U-shaped leaf spring 122 has an inclined segment 125 facing inward and corresponding to the inclined surface 177 of the slide 17 so that when the slide 17 is moved toward the U-shaped spring 122 to bring the inclined surface 177 into contact and camming engagement with the inclined segment 125, the camming action therebetween forces the second limb of leaf spring 122 to which the pin 123 is fixed to move toward the first limb so as to withdraw the pin 123 from the hole 132 of the lower section 13 of the upright rod 20.

With particular reference to FIG. 2, the slide 17 that is received within each of the upright bars 20 is connected to the movable press member 101 by means of for example a link 19. In the embodiment, the link 19 has two ends respectively received and retained with a hole 103 formed on the movable press member 101 and a hole 178 formed on the slide 17 so that when the press member 101 is moved, the slide 17 is forced to move within the upright bar 20. Biasing means, such as spring 102, may be provided between the movable press member 101 and the handle 10 so as to bias the press member 101 to a non-actuated position, as shown in FIG. 2. Once the press member 101 is gripped and depressed by a user's hand relative to the handle 10 to move from the non-actuated position to an actuated position shown in FIG. 3, the upper segment 171 of the slide 17 is moved relative to the upper section 11 from a bar expansion position shown in FIG. 2 to a bar contractible position shown in FIG. 3.

In expanding the upright bars 20, the user simply holds the handle 10, together with the press member 101, and pulls upward. At this time, by being held by the user, the press member 101 is also depressed and moving relative to the handle 10. The intermediate section 12 of each of the upright bars 20 is moved upward relative to the respective lower section 13 until the intermediate section 12 reaches the expanded position shown in FIG. 2, where a stop ring 121 which is fixed on lower end of the intermediate section 12 is in contact engagement with and stopped by an inward stop flange 131 formed on upper end of the lower section 13. The hole 132 of the lower section 13 now aligns with the hole 126 of the intermediate section 12 in which the positioning pin 123 is received. The pin 123, however, is still not allowed to engage the hole 132 of the lower section 13 since the inclined surface 177 of the slide 17 is still in engagement with the inclined segment 125 of the leaf spring 122 and thus forcing the pin 123 to be located inward the lower section 13.

Further pulling the handle 10 upward moves the upper section 11 relative to the intermediate section 12, disengaging the inclined surface 177 of the slide 17 from the inclined segment 125 of the leaf spring 122 so as to allow the pin 123 to get into the hole 132 by means of the biasing force of the leaf spring 122 and thus retaining the intermediate section 12 and the lower section 13 at the expanded position.

Once the upper section 11 of the upright bar 20 reaches the expanded position where a stop ring 111 fixed on lower end of the upper section 11 is brought into contact with and stopped by an inward stop flange 127 formed on upper end of the intermediate section 12, the hole 112 of the upper section 12 in Which the spherical member 18 is retained is brought into alignment with the hole 124 of the intermediate section 12. By releasing the press member 101, the biasing force of the springs 120 forces the slide 17 to move downward relative to the upper section 11 and force the spherical member 18 to move outward and partially enter the hole 124 of the intermediate section 12 by means of the inclination of the slot 173. This retains the upper section 11 and the intermediate section 12 at the expanded position.

In contracting the upright bars 20, by depressing the press member 101 relative to the handle 10, the slide 17 is moved relative to the upper section 11 until the circumferential shoulder 175 gets into contact with the lower end of the upper section 11, as shown in FIG. 3. During this movement, the spherical member 18 is allowed to withdrawn from the hole 124 of the intermediate section 12 to enter the recess 124 of the slot 123. This releases the upper section 11 from the intermediate section 12 and the upper section 11 is allowed to telescoped into the intermediate section 12 to a stowed position shown in FIG. 3.

Once the upper section 11 is substantially completely telescoped into the intermediate section 12, the inclined surface 173 of the slide 17 engages the inclined segment 125 of the leaf spring 122, providing a camming action thereon to withdraw the pin 123 out of the hole 132 of the lower section 13 so as to release the intermediate section 12 from the lower section 13 and to allow the intermediate section 12 to be telescoped into the lower section 13 to the stowed positing as shown in FIG. 3. The upright bars 20 are now completely contracted to the stowed position.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A luggage trolley structure comprising a wheeled base plate having two upright bars extending upward therefrom in a spaced and substantially parallel manner with a handle extending between upper free ends of the two upright bars, each of the upright bars comprising an upper section which telescopes into an intermediate section which is in turn telescopically received into a lower section that is fixed on the base plate, a telescoping mechanism being provided within each of the upright bars wherein the telescoping mechanism comprises:

a slide having an upper segment movably receivable within the upper section and connected to a control member, which is manually movably mounted to the handle, to be moved thereby and a lower segment fixed to a lower end of the upper segment to be located within the intermediate section, a circumferential shoulder being defined between the upper segment and lower segment to cooperate with the lower end of the upper section for stopping relative movement of the slide with respect to the upper section, a slot being formed on the upper section having a depth varying from a smallest value at an upper end of the slot to a greatest value at a lower end of the slot so as to define an inclined bottom, a spherical member that is partially received and retained within a first hole formed on the upper section being allowed to be partially received within the slot so that when the slide is moved relative to the upper section, the spherical member is forced by the inclination to project out of the first hole and partially enter a second hole formed on the intermediate section, the greatest value of the depth of the slot being so selected as to allow the spherical member to be fully withdrawn from the second hole, an inward inclined surface being provided on the lower segment of the slide;

a leaf spring having a first limb fixed inside the intermediate section and a second limb fixed to a positioning pin received and movably retained within a third hole formed on the intermediate section so as to bias the positioning pin into a fourth hole formed on the lower section, the leaf spring having an inclined segment corresponding to the inclined surface of the lower segment of the slide so as to be cammingly engageable with the inclined surface to deform the leaf spring for withdrawing the positioning pin from the fourth hole; and biasing means for biasing the control member relative to the handle to move the slide in such a direction to have the spherical member located at a point of the slot that has the smallest value of depth.

2. The luggage trolley structure as claimed in claim 1, wherein a recess is formed on a point of the slot that has the greatest value of depth for receiving the spherical member therein.

3. The luggage trolley structure as claimed in claim 1, wherein the biasing means comprises spring having one end fixed to the handle and an opposite end fixed to the control member.

* * * * *